United States Patent [19]

Wolf et al.

[11] Patent Number: 4,535,229
[45] Date of Patent: Aug. 13, 1985

[54] SAUCEPAN AND COVER FOR A COOKING UTENSIL, PARTICULARLY A STEAM PRESSURE COOKING PAN

[75] Inventors: Kurt Wolf, Langwiesenweg; Wolfram K. Andre, Eichenweg, both of Fed. Rep. of Germany

[73] Assignee: Kurt Wolf & Co. KG, Fed. Rep. of Germany

[21] Appl. No.: 539,482

[22] Filed: Oct. 6, 1983

[30] Foreign Application Priority Data

Oct. 20, 1982 [DE] Fed. Rep. of Germany ....... 3238768

[51] Int. Cl.³ ............................................. F27D 11/00
[52] U.S. Cl. ..................................... 219/440; 99/344; 99/352; 219/431; 219/432; 219/435; 219/441; 126/348; 116/148
[58] Field of Search ............... 219/401, 430, 431, 432, 219/435, 436, 440, 441, 442; 99/344, 323.4, 352, 467; 126/348, 20, 369; 116/148; 340/396, 417; 320/2

[56] References Cited

U.S. PATENT DOCUMENTS

| | | | |
|---|---|---|---|
| 2,428,642 | 10/1947 | Weeks | 219/440 X |
| 2,440,128 | 4/1948 | Sullivan | 219/440 X |
| 2,571,782 | 10/1951 | Swenson | 219/440 |
| 2,906,191 | 9/1959 | Lee, Sr. | 219/431 |
| 3,781,521 | 12/1973 | Kircher | 219/442 |
| 3,828,164 | 8/1974 | Fischer et al. | 219/431 |
| 4,008,385 | 2/1977 | Draghi | 219/269 |
| 4,303,816 | 12/1981 | Goessler et al. | 219/431 X |

FOREIGN PATENT DOCUMENTS 2909129 9/1980 Fed. Rep. of Germany .

*Primary Examiner*—Volodymyr Y. Mayewsky
*Attorney, Agent, or Firm*—Thomas W. Speckman

[57] ABSTRACT

The invention relates to a cooking vessel comprising a cooking pan and cover, especially a steam pressure cooker, to which a temperature-dependent resistor is attached as a temperature sensor with an attached computing device for the determination of the temperature inside the cooking pot, and for the transmission of electrical signals corresponding to the temperature detected.

In order for the cooking vessel to be equipped for an exact measurement of temperature without greatly increasing costs, a measuring point covered by the handle is provided, to which a temperature sensor is attached. One of the handles of the cooking pot or cover carries a plug accommodation with connection contacts, which mechanically accommodates a computing device formed as a plug unit, and connects electrically with the temperature sensor.

11 Claims, 5 Drawing Figures

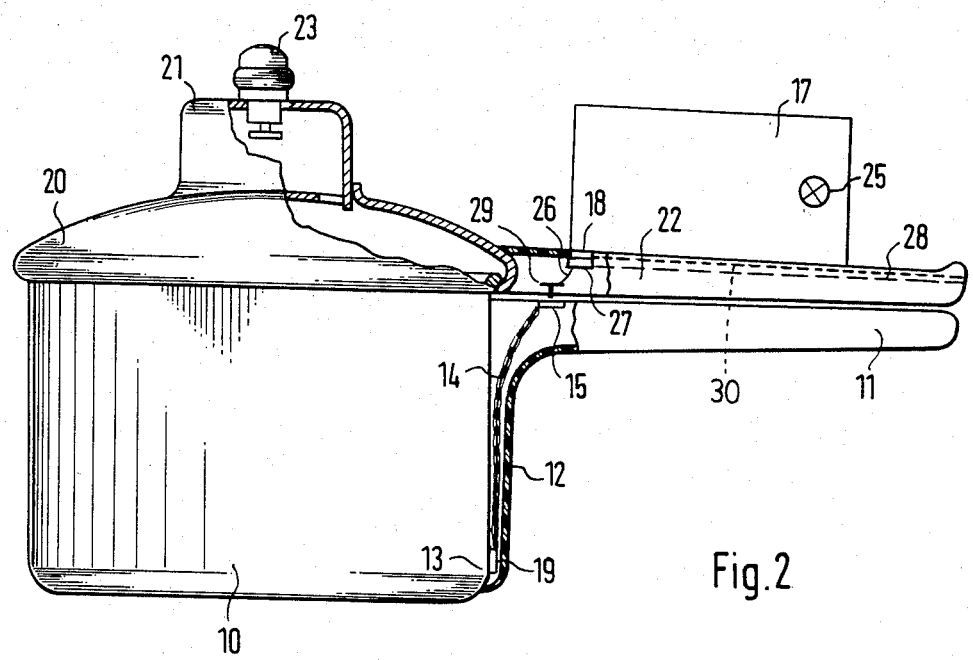
Fig.2
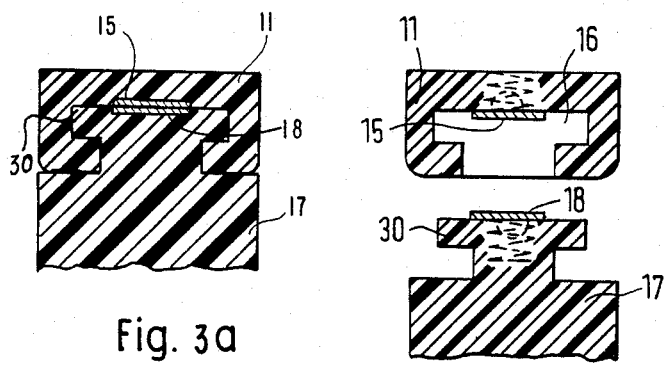
Fig.3
Fig. 3a

SAUCEPAN AND COVER FOR A COOKING UTENSIL, PARTICULARLY A STEAM PRESSURE COOKING PAN

BACKGROUND OF THE INVENTION

1. Field of the Invention

This invention concerns a cooking vessel comprising a saucepan and a cover, especially a steam pressure cooker, to which a temperature-dependent resistor is attached as a temperature sensor with an attached computing device for the determination of the temperature inside the cooking pan when subjected to any heat source, and for the transmission of electrical signals corresponding to the temperature detected.

2. Description of the Prior Art

Known cooking vessels such as disclosed in German Patent Publication DE-OS No. 2832039 have various disadvantages. For one thing, temperature detection in the area of the excess pressure valve, especially during the heating phase, is very inaccurate. Another disadvantage is the computing device being a fixed component of the cooking vessel. This type computing device can perform only its own specific function of indicating specific temperature values, or issuing wireless electrical control signals for influencing the fermentation time selector, or for the regulation of heat production. Each cooking vessel requires its own computing device, which must be so designed and constructed that it is protected against penetrating dampness during the cleaning of the cover.

A cooking vessel is known from German Patent Publication DE-OS No. 2909129, in which the excess pressure valve controls a mechanical indicator device and an electrical switch, which switches on an acoustical signaller upon reaching a preselected temperature. The acoustic signaller is mounted on the excess pressure valve accommodated within the button of the cover.

The known type of cooking vessel requires a specially shaped excess pressure valve, but has, however, the advantage that the acoustic signaller can be detached from the cover during cleaning of the cover. A temperature measurement, as with a temperature sensor is, however, not possible with this cooking vessel; and, moreover, the electrical switch is released at a preselected temperature in the area of the cover, which, during the heating phase, does not correspond to the temperature of the water contents. The critical temperature of the water contents is already reached before a signal is issued to the computing device. This condition is undesirable, since the opening of the cover in this phase can be dangerous.

SUMMARY OF THE INVENTION

It is an object of the invention to create a cooking vessel of the general type mentioned above, which is provided, at a minimal additional expense, with a temperature measurer, and which makes possible, according to desired indications or regulation, the use of various computing devices which, moreover, should be usable for several cooking vessels.

This object is achieved by the invention in this manner: a measuring point if provided on the external surface of the cooking pot near the pot bottom, to which a temperature sensor is either attached or attachable in a heat-conducting contact, in which the mounting point is covered by means of an attachment of a handle detachably fixed to the cooking pot, in which the handle of the cooking pot has a plug receptacle for the computing device shaped as a separate plug unit, in which connection contacts for counter-contacts located on the plug unit are provided, and in which the plug unit is mechanically insertable into the plug receptacle, whereby the counter-contacts of the plug unit and the connection contacts located in the plug receptacle are in electrically-conducting contact to one another. In another manner, a measuring point is provided on the external surface of the cooking pot; to which a temperature sensor is either attached or attachable in a heat-conducting connection, in which the measuring point is covered by means of a handle detachably fixed to the cooking pot, in which the handle of the cooking pot adjacent the handle of the cover is provided with connection contacts which, in the closed position of the cooking vessel, are in contact with counter-contacts attached to the handle of the cover, in which the handle of the cover has a plug receptacle for a computing device shaped as a separate plug unit, in which connection contacts are provided for the counter-contacts located on the plug unit, in which the counter-contacts and the connection contacts in the handle of the cover are in electrical contact with each other, and in which the plug unit is mechanically insertable into the plug receptacle, whereby the counter-contacts of the plug unit are in electrically-conductive contact with the connection contacts insertable in the plug receptacle.

The cooking pot with its handle is so shaped that it enables the attachment, at any time, of a temperature sensor at an optimally selected measuring point. The computing device, formed as a separate plug unit, is connectable at will with any of the cooking vessels, and represents an independent unit, which can be designed according to its desired function: whether simply the indication of a specific temperature value, or the issuance of a wireless control signal corresponding to the temperature detected. The temperature sensor can, however, also be connected tightly with the cooking pot, and integrated with its connection contacts into the handle of cooking pot. The cooking vessel is adjustable according to the functions desired. It is not important for the cooking vessel as to how the signals of the computing device appear, and what is effected by these signals. The cooking vessel thus created is prepared for all possible further developments of the cooking and fermentation process, for the regulation of heat production, and the like. The handles on the cooking pot and on the cover can maintain their ergonomically-favorable form for the handling of the cooking vessel practically unaltered, since the plug receptacle in the handle of the cooking pot and cover is formed with recesses running in a longitudinal direction, in which the plug unit, with a mating part, is insertable and mechanically adjustable.

If the temperature sensor is to be permanently attached to the cooking pot, then, according to a preferred embodiment, it is provided that the temperature sensor is securely connected with the measuring point, whether joined or welded, and the temperature sensor is connected by means of a connection cable led within a recess of the handle attachment, with the connection contacts in the plug receptacle of the handle of the cooking pot and the connection contacts of the handle of the cooking pot facing the handle of the cover.

If the temperature sensor is to be adjustable, then one embodiment is particularly advantageous. This is distinguished by the fact that the cooking pot in the area of the measuring point has a thread bolt, to which a mounting plate is detachably boltable, enclosing the temperature sensor and being in a heat-conducting connection to it. In a practical embodiment, it can additionally be provided that the threaded bolt is used in addition for attachment of the handle to the cooking pot.

With the connection of the plug unit to the handle of the cooking pot or the handle of the cover, it is provided, according to further embodiments, that the plug receptacle is inserted into the underside of the handle which projects horizontally to the cooking pot, or that the plug receptacle is placed in the upper side of the handle which projects horizontally to the cover.

An unambiguous electrical interconnection between the two handles is attained through one embodiment, in which the connection contacts and counter-contacts of the handles facing one another are formed as sliding contacts and sliding surfaces of sliding contact connections, so that the sliding surfaces are oriented laterally to the longitudinal axis of the handles.

The plug unit is, in accordance with the function desired, so formed that the plug unit is provided with optical indicator elements which, upon reaching preselected temperatures, give off indicator signs, and/or in which the plug unit is provided with an ultrasonic or infrared transmitter, which radiates electrical signals corresponding to the temperature detected.

BRIEF DESCRIPTION OF THE DRAWING

The invention is further elucidated by means of specific examples of embodiments depicted in the drawing, wherein:

FIG. 2 shows a cooking vessel with temperature sensor on the cooking pot and a plug receptacle for the computing device in the form of a plug unit on the upper side of the handle to the cover;

FIG. 3 shows an enlarged partial cross-sectional view at line 3—3 shown in FIG. 1 of the plug connection between the handle of the cooking pot and of the computing device in the form of a plug unit in disconnected condition;

FIG. 3a shows the same cross section as FIG. 3 in connected condition; and

DESCRIPTION OF PREFERRED EMBODIMENTS

Figure 1:
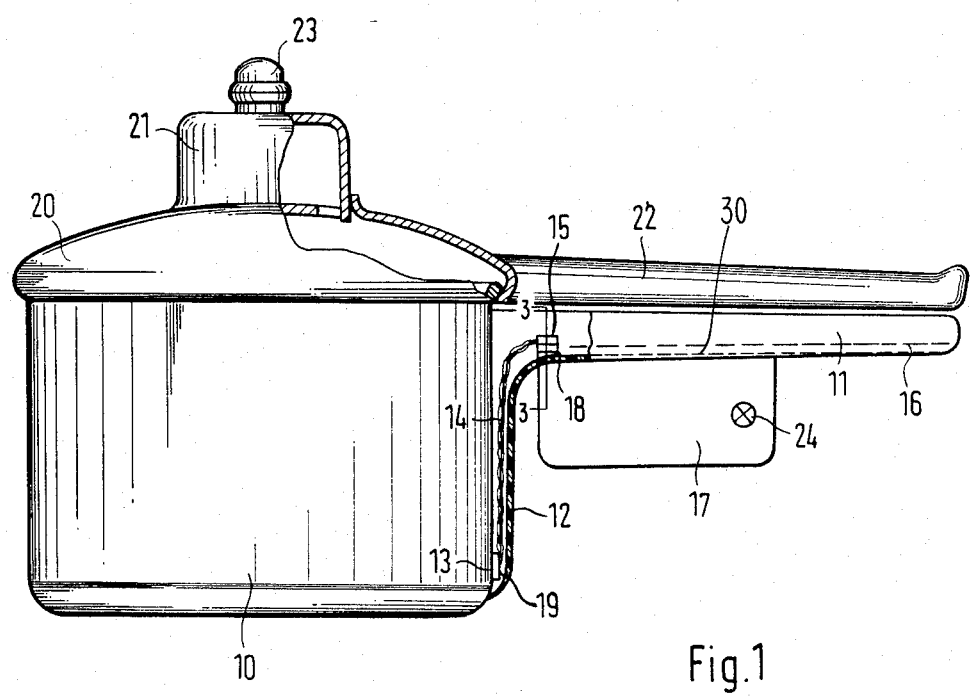
FIG. 1 shows a cooking vessel with temperature sensor on the cooking pot and a plug receptacle for the computing device in the form of a plug unit on the bottom side of the handle of the cooking pot.

According to the invention, the cooking vessel consists of cooking pot (10) of heat conductive material and cover (20). Heat is applied to the bottom of cooking pot (10) from an external source. Horizontally projecting handle (11) is attached to pot (10), and horizontally projecting handle (22) is attached to cover (20). Handles (11 and 22) stand adjacent one another in the closed position of the cooking vessel and serve, in the known manner, for locking of cover (20) and cooking pot (10). Excess pressure valve is accommodated in dome (21) of cover (20), which controls indicator device (23). This basic configuration of the cooking vessel is also retained in this invention, as shown in the embodiments in FIGS. 1 and 2.

According to the invention, measuring point (13) is located on the external side of cooking pot (10) for measuring the temperature; measuring point (13) is located at the beginning of convex transition region between the pot wall and the pot bottom. Measuring point (13) is selected, since here the temperature difference between the temperature of the water contents and of the external surface of cooking pot (10) during the heating phase is approximately zero. If temperature sensor (19) is attached to measuring point (13) in a heat-conducting connection, then the temperature of the water contents is correctly determined in the critical heating phase. This is important, since steam formation starts with reaching of the critical temperature of about 100° C., and opening cover (20) during this phase is already dangerous. Indicator device (23) on cover (20) does not operate upon reaching this temperature, since a certain pressure is necessary inside the cooking vessel for its operation.

If the cooking vessel alone is heated, then the place at which the temperature is measured is not critical, since the entire internal space of the cooking vessel exhibits practically the same temperature. Thus the temperature is accurately measured even in the heated condition.

The advantage of the new cooking vessel lies in the fact that measuring point (13) is provided in every instance, and is covered by means of attachment (12) of handle (11). Moreover, in the embodiment according to FIG. 1, a longtudinally-directed plug receptacle (16) is disposed on the underside of handle (11), in which the computing device can be mechanically inserted as a separately-formed plug unit (17). As FIG. 3 shows, the plug receptacle (16) can be a recess groove cut in a T-form in cross section, into which T-formed plug part (30) of plug unit (17) is inserted, and can be thus mechanically held. Plug receptacle (16) may be provided with springed connection contacts (15), which provide electrical connection with corresponding counter-contacts (18) on plug unit (17), if plug unit (17) is properly positioned in plug receptacle (16), as the springs indicated show.

It is easy to appreciate that plug receptacle (16) can accept different computing devices if these are shaped identical to plug unit (17).

Temperature sensor (19) can be attached to the pot at measuring point (13), and is already electrically connected with connection contacts (15) in handle (11) by means of connection cable (14). This additional expense raises the price of the cooking vessel negligibly, but is, however, provided for an exact detection of the temperature. Only a computing device need be supplied later which, furthermore, can be used with several cooking vessels so prepared, and can also be extended for different functions.

If the indicator device has optical indicator lamps (24), then specific preselected temperatures can be indicated in a simple manner. The most important is reaching of the critical temperature of about 100° C. during the heating phase, since, from this point of time onwards, opening the lid is dangerous. Moreover, this signal indicating the critical temperature can also be used for the control of a fermentation time selector. This is advantageous if computing device plug unit (17), as shown in the embodiment of FIG. 2, has an ultrasonic or infrared transmitter (25), which conveys the signal wirelessly to a separate fermentation time selector or the like. The signals thus issued by the computing device and transmitted wirelessly can, with suitable receiver devices, also be used for controlling heat production, for which it is very essential to detect exactly the temperature during the heating phase, in order to be able to adjust the work temperature more optimally during more rapid heating during the final phase of the heating process.

In the embodiment shown in FIG. 2, plug unit (17) can be inserted into longitudinally-directed plug receptacle (28) of handle (22) of cover (20), and mechanically held therein. Plug receptacle (28) has additional connection contacts (27), which come into contact with the counter-contacts (18) of plug unit (17). Connection cable (14) from temperature sensor (19) leads to connection contacts (15) in handle (11) of cooking pot (10), which are facing the adjacent side of handle (22) of cover (20). Handle (22) of cover (20) has counter-contacts (29) which, by means of connection cable (26), are electrically connected with connection contacts (27) in handle (22) of cover (20). Connection contacts (15) in handle (11) of cooking pot (10), and counter-contacts (29) in handle (22) of cover (20), are formed as sliding contacts and sliding surfaces of sliding contact connections, which interconnect in the closed position of the cooking vessel. The sliding surfaces are thereby directed laterally to the longitudinal axis of handles (11 and 22).

Figure 4:
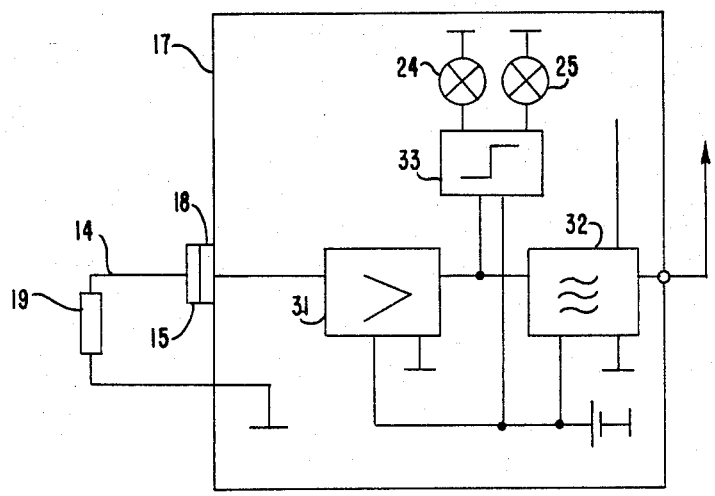
FIG. 4 shows a suitable electrical circuit housed in the plug unit.

Suitable circuitry for one embodiment of plug unit 17 having both optical indicator lamp 24 and ultrasonic or infrared transmitter 25 is shown in FIG. 4. Signals from temperature sensor 19, transmitted to plug unit 17 as described above, are amplified by amplifier 31. The amplified signal may be delivered to high frequency oscillator 32, which sends signals to an external control circuit for controlling heating.

The frequency of the high frequency signal emitted by oscillator 32 is directly related to the value of the measured temperature. Optical indicator lamb 24 and ultrasonic infrared transmitter 25 are controlled by signals emitted from amplifer 31 and delivered to threshold circuit 33. Threshold circuit 33 detects a predetermined value of the amplified signal corresponding to a predetermined measured temperature value. Thus lamp 24 and transmitter 25 may be triggered to respond only when an amplified signal corresponding to a predetermined measured temperature value is received.

We claim:

1. A cooking vessel comprising a saucepan of heat conductive material and a cover, particularly a steam pressure cooker, to which heat is applied from an external heat source underneath said saucepan and to which a temperature-dependent resistor is attached as a temperature sensor and connected to a computing device for determination of the temperature inside said saucepan and for the transmission of electrical signals corresponding to the temperature detected, characterized by a measuring point (13) being located on the external surface of said saucepan (10) in the transition region between the pan wall and the pan bottom, said temperature sensor (19) being mounted to said pan (10) at said measuring point (13) in a heat-conducting fashion; said measuring point (13) and said temperature sensor (19) being covered by an attachment portion (12) of a handle (11) which is mounted detachably on said pan (10); said handle (11) of said pan (10) having a plug receptacle (16) to receive said computing device formed as a separate plug unit (17) in which connection contact (15) in communication with said temperature sensor (19) is provided to match counter-contact (18) provided on said plug unit (17); and said plug unit (17) being insertable mechanically in said plug receptacle (16), whereby said counter-contact (18) of said plug unit (17) and said connection contact (15) in said plug receptacle are in electrically-conductive contact.

2. Cooking vessel according to claim 1, characterized by said temperature sensor (19) being connected to said pan (10) at said measuring point (13) by welding and said temperature sensor (19) is connected by means of connection cable (14) which passes through said handle attachment portion (12) to said connection contact (15) in said plug receptacle (16) of said handle (11) of said cooking vessel, which faces handle (22) mounted on cover (20).

3. Cooking vessel according to claim 1 characterized by said pan (10) having a threaded bolt in the area of said measuring point (13), to which a mounting clamp surrounding said temperature sensor (19) and being in a heat-conductive contact with said sensor (19) can be attached.

4. Cooking vessel according to claim 3, characterized by said threaded bolt being additionally used for fixing the attachment (12) of said handle (11) to said pan (10).

5. Cooking vessel according to claim 1, characterized by said plug receptacle (16) in said handle (11) of said cooking pan (10) being formed by an undercut T-shaped recess passing longitudinally along said handle, into which said plug unit (17), having mating plug part (30) is insertable and mechanically adjustable.

6. Cooking vessel according to claim 5, characterized by said plug receptacle (16) being formed on the underside of said handle (11) which projects horizontally from said pan (10).

7. Cooking vessel according to claim 1, characterized by said plug unit (17) having optical indicator elements (24), which emit indicator signals upon reaching preselected temperatures.

8. Cooking vessel according to claim 1, characterized by said plug unit (17) being provided with an ultrasonic or infrared wave transmitter (25), which radiates electrical signals which correspond to the temperature detected.

9. Cooking vessel according to claim 2, characterized by said plug receptacle (16) in said handle (11) of said cooking pan (10) being formed by an undercut T-shaped recess passing longitudinally along said handle, into which said plug unit (17) having mating plug part (30) is insertable and mechanically adjustable.

10. Cooking vessel according to claim 3, characterized by said receptacle (16) in said handle (11) of said cooking pan (10) being formed by an undercut T-shaped recess passing longitudinally along said handle, into which said plug unit (17) having mating plug part (30) is insertable and mechanically adjustable.

11. A cooking vessel comprising a saucepan of heat conductive material and a cover, particularly a steam pressure cooker, to which heat is applied from an external source underneath said saucepan and to which a temperature-dependent resistor is attached as a temperature sensor and connected to a computing device for determination of the temperature inside said saucepan, and for the transmission of electrical signals corresponding to the temperature detected, characterized by a measuring point (13) being located on the external surface of said pan (10) in the transition region between the pan wall and the pan bottom, said temperature sensor (19) being mounted to said pan (10) at said measuring point (13) in a heat-conducting fashion; said measuring point (13) and said temperature sensor (19) being covered by an attachment portion (12) of a pan handle (11) which is mounted detachably on said pan (10); one of said pan handle (11) and a cover handle (22) mounted on cover (20) having a plug receptacle (16, 28), respectively to receive said computing device formed as a separate plug unit (17) in which a connection contact (15, 27) provided to match counter-contact (18) provided on said plug unit (17); and said plug unit (17) being insertable mechanically in said plug receptacle (16, 28), whereby said counter-contact (18) of said plug unit (17) and said connection contact (15, 27) in said plug receptacle (16, 28) are in electrically-conductive contact.

* * * * *